US010525957B2

(12) United States Patent
Houtman et al.

(10) Patent No.: US 10,525,957 B2
(45) Date of Patent: *Jan. 7, 2020

(54) BRAKE-BY-WIRE SYSTEM

(71) Applicant: GM Global Technology Operations LLC, Detroit, MI (US)

(72) Inventors: Alan J. Houtman, Milford, MI (US); Christopher C. Chappell, Commerce Township, MI (US); Kevin S. Kidston, New Hudson, MI (US); Paul A. Kilmurray, Wixom, MI (US); Eric E. Krueger, Chelsea, MI (US); Patrick J. Monsere, Highland, MI (US); Brandon C. Pennala, Howell, MI (US); Michael C. Roberts, Auburn Hills, MI (US); Steven J. Weber, Mount Clemens, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 284 days.

This patent is subject to a terminal disclaimer.

(21) Appl. No.: 15/252,749

(22) Filed: Aug. 31, 2016

(65) Prior Publication Data

US 2018/0056965 A1 Mar. 1, 2018

(51) Int. Cl.
*B60T 13/74* (2006.01)
*B60T 17/18* (2006.01)
*B60T 17/22* (2006.01)

(52) U.S. Cl.
CPC ............ *B60T 13/741* (2013.01); *B60T 17/18* (2013.01); *B60T 17/22* (2013.01);
(Continued)

(58) Field of Classification Search
CPC ...... F16D 2121/24; B60T 8/885; B60T 8/321; B60T 2270/413; B60T 2270/404; B60T 2270/402
See application file for complete search history.

(56) References Cited

U.S. PATENT DOCUMENTS 5,366,280 A * 11/1994 Littlejohn ............... B60L 15/20
188/1.11 L
5,620,077 A * 4/1997 Richard ................ B60T 13/743
188/173
(Continued)

*Primary Examiner* — Bradley T King
*Assistant Examiner* — Stephen M Bowes
(74) *Attorney, Agent, or Firm* — Cantor Colburn LLP

(57) ABSTRACT

A vehicle includes a plurality of brake assemblies configured to control braking of a respective wheel of the vehicle. The brake assemblies includes a first brake assembly integrated with a smart actuator unit including a first actuator controller and a first electro-mechanical actuator that is configured to adjust a brake force applied to a first wheel coupled to the first brake assembly. A second brake assembly excludes an actuator controller and has installed therein a second electro-mechanical actuator that is configured to adjust a brake force applied to a second wheel coupled to the second brake assembly. At least one electronic actuator driver unit is remotely located from the first and second brake assemblies, and is configured to output a high-power signal that drives the first and second electro-mechanical actuators in response to receiving a digital command signal from the first actuator controller.

19 Claims, 6 Drawing Sheets

(52) U.S. Cl.
CPC ... *B60T 2270/402* (2013.01); *B60T 2270/404* (2013.01); *B60T 2270/414* (2013.01); *B60T 2270/415* (2013.01); *B60T 2270/82* (2013.01)

(56) References Cited

U.S. PATENT DOCUMENTS

| | | | | |
|---|---|---|---|---|
| 6,345,225 | B1* | 2/2002 | Bohm | B60T 8/321 |
| | | | | 180/197 |
| 8,682,559 | B2* | 3/2014 | Kolbe | B60T 8/17616 |
| | | | | 701/1 |
| 2006/0212135 | A1* | 9/2006 | Degoul | B60T 8/321 |
| | | | | 700/9 |
| 2007/0199775 | A1* | 8/2007 | Yasukawa | B60T 13/741 |
| | | | | 188/73.1 |
| 2007/0222284 | A1* | 9/2007 | Matsubara | B60T 8/885 |
| | | | | 303/122.04 |
| 2007/0235267 | A1* | 10/2007 | Liebert | B60T 7/108 |
| | | | | 188/1.11 L |
| 2008/0236964 | A1* | 10/2008 | Kikuchi | B60T 13/741 |
| | | | | 188/162 |
| 2010/0204894 | A1* | 8/2010 | Strengert | B60T 17/221 |
| | | | | 701/70 |
| 2011/0320099 | A1* | 12/2011 | Kim | B60T 8/885 |
| | | | | 701/70 |
| 2018/0056964 | A1* | 3/2018 | Pennala | B60T 13/741 |

\* cited by examiner

BRAKE-BY-WIRE SYSTEM

FIELD OF INVENTION

The invention disclosed herein relates to vehicle braking systems and, more particularly, to a vehicle including a brake-by-wire (BBW) system.

BACKGROUND

Current industrial automotive trends to reduce the number of overall mechanical components of the vehicle and to reduce the overall vehicle weight have contributed to the development of system-by-wire applications, typically referred to as X-by-wire systems. One such X-by-wire system that has received increased attention is a brake-by-wire (BBW) system, sometimes referred to as an electronic braking system (EBS).

Unlike conventional mechanical braking systems, BBW systems actuate one or more vehicle braking components via an electric signal that is generated by an on-board processor/controller or is received from a source external to the vehicle. In some systems, a BBW system is effected by supplanting a conventional hydraulic fluid-based service braking system with an electrical base system to perform basic braking functions. Such a system is typically provided with a manually actuated back-up system that may be hydraulically operated.

Since BBW systems typically remove any direct mechanical linkages and/or hydraulic force-transmitting-paths between the vehicle operator and the brake control units, much attention has been given to designing BBW control systems and control architectures that ensure reliable and robust operation. Various design techniques have been implemented to promote the reliability of the BBW system including, for example, redundancy, fault tolerance to undesired events (e.g., events affecting control signals, data, hardware, software or other elements of such systems), fault monitoring and recovery. One conventional design approach to provide fault tolerance which has been utilized in BBW control systems has been to include a mechanical backup system that may be utilized as an alternate means for braking the vehicle.

SUMMARY

According to a non-limiting embodiment, a vehicle is provided that includes a plurality of brake assemblies configured to control braking of a respective wheel of the vehicle. The brake assemblies include a first brake assembly integrated with a smart actuator unit including a first actuator controller and a first electro-mechanical actuator that is configured to adjust a brake force applied to a first wheel coupled to the first brake assembly. A second brake assembly excludes an actuator controller and has installed therein a second electro-mechanical actuator that is configured to adjust a brake force applied to a second wheel coupled to the second brake assembly. At least one electronic actuator driver unit is remotely located from the first and second brake assemblies, and is configured to output a high-power signal that drives the first and second electro-mechanical actuators in response to receiving a digital command signal from the first actuator controller.

According to another non-limiting embodiment, a vehicle is provided that includes a fault tolerant electronic brake-by-wire (BBW) system. The vehicle includes a plurality of brake assemblies configured to control braking of respective wheel of the vehicle. The plurality of brake assemblies comprises a first group of brake assemblies and a second group of brake assemblies. The brake assemblies of the first group are each integrated with an electronic smart actuator unit that includes an electronic actuator controller and an electro-mechanical actuator. The brake assemblies of the second group each exclude an electronic actuator controller and have a slave electro-mechanical actuator installed therein. The vehicle further includes first and second actuator driver units located remotely from the brake assemblies. Each of the first and second actuator driver units are in electrical communication with each electro-mechanical actuator of the first group and each slave electro-mechanical actuator of the second group.

According to still another non-limiting embodiment, a method of controlling a fault tolerant electronic brake-by-wire (BBW) system comprises integrating in a first smart brake assembly a first smart actuator unit including a first electronic actuator controller and a first electro-mechanical actuator, and integrating in a first slave brake assembly a first slave electro-mechanical actuator that excludes an electronic actuator controller. The method further includes outputting via the first electronic actuator controller a first digital command signal that initiates a first actuator driver unit located remotely from the first smart brake assembly and the first slave brake assembly. In response to the first digital command signal, the first actuator driver unit outputs a high-power drive signal that controls braking of a first wheel coupled to the first brake assembly and controls braking of a second wheel coupled to the first slave brake assembly.

The above features and advantages and other features and advantages of the invention are readily apparent from the following detailed description of the invention when taken in connection with the accompanying drawings.

BRIEF DESCRIPTION OF THE DRAWINGS

Other features and details appear, by way of example only, in the following detailed description of embodiments, the detailed description referring to the drawings in which.

DESCRIPTION OF THE EMBODIMENTS

Figure 1:
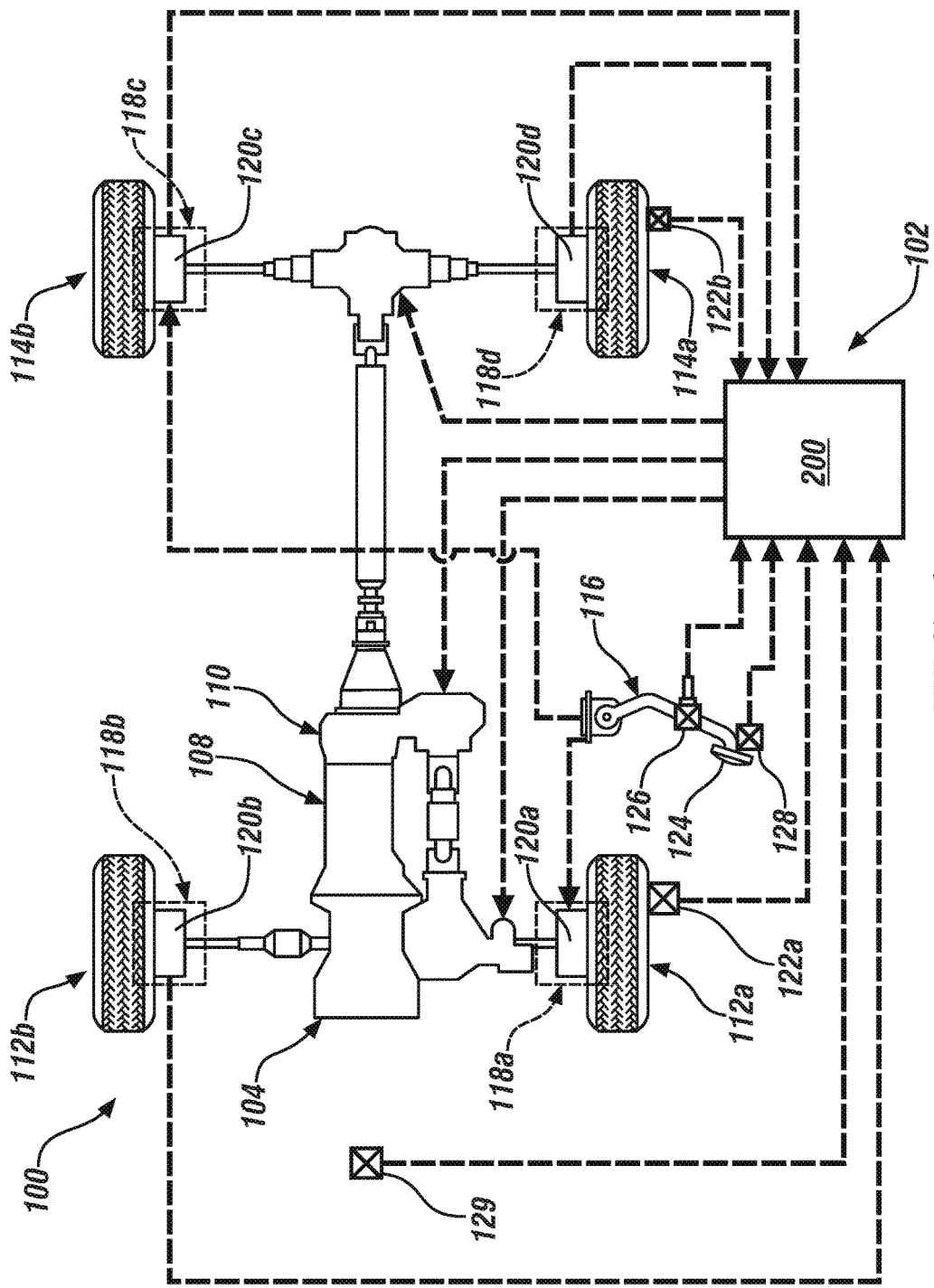
FIG. 1 is a top schematic view of a vehicle having a fault tolerant BBW mechanism in accordance with an embodiment.

The following description is merely exemplary in nature and is not intended to limit the present disclosure, its application or uses. It should be understood that throughout the drawings, corresponding reference numerals indicate like or corresponding parts and features.

Various non-limiting embodiments provide a fault tolerant BBW system including at least one smart brake assembly and at least one slave brake assembly. The smart brake assembly includes a smart brake actuator unit integrating together an electronic actuator controller and an electro-mechanical actuator, while the slave brake assembly excludes an actuator controller but still includes an electro-mechanical actuator as understood by one of ordinary skill in the art. According to a non-limiting embodiment, a first group of brake assemblies integrated with a smart actuator unit are referred to as the smart brake assemblies, while a second group of brake assemblies that exclude an electronic actuator controller are referred to as the slave brake assemblies.

The BBW system further includes one or more actuator driver units located remotely (i.e., externally) from the smart bake assembly and the slave brake assembly. In at least one embodiment where multiple actuator driver units are installed, each actuator driver unit is electrically connected to a respective actuator controller. In this manner, each actuator controller outputs an individual digital command signal to a respective actuator driver unit. In response to receiving the digital command signal, the actuator driver unit outputs a high-power drive signal such as a high-frequency switched high-current signal, for example, which drives the electro-mechanical actuator included in the smart brake assembly and the slave electro-mechanical actuator included in the slave brake assembly. In at least one embodiment, each actuator driver unit is capable of driving the electro-mechanical actuators in each smart brake assembly and each slave brake assembly. Locating the actuator driver units remotely (e.g., externally) from the brake assemblies exposes the actuator controller to lower levels of electromagnetic compatibility (EMC) (e.g., generation, propagation and reception of electromagnetic energy). The actuator driver units are also known to generate excessive heat due to the switching high-power output signals. Therefore, locating the actuator driver units remotely from the brake assemblies also protects the actuator controllers and electro-mechanical actuators from excessive temperatures.

With reference now to FIG. 1, a vehicle 100, including a fault tolerant BBW system 102 configured to electronically control braking of the vehicle 100 is illustrated according to a non-limiting embodiment. The vehicle 100 is driven by a powertrain system that includes an engine 104, a transmission 108 and a transfer case 110. The engine 104 includes, for example, an internal combustion engine 104 that is configured to generate drive torque that drives front wheels 112a and 112b and rear wheels 114a and 114b using various components of the vehicle driveline. Various types of engines 104 may be employed in the vehicle 100 including, but not limited to a diesel engine, a gasoline engine, and a hybrid-type engine that combines an internal combustion engine with an electric motor, for example. The fault tolerant BBW system may also be implemented in a battery electric vehicle including an electric motor without departing from the scope of the invention. The vehicle driveline may be understood to comprise the various powertrain components, excluding the engine 104. According to a non-limiting embodiment, engine drive torque is transferred to the transmission 108 via a rotatable crank shaft (not shown). Thus, the torque supplied to the transmission 108 may be adjusted in various manners including, for example, by controlling operation of the engine 104 as understood by one of ordinary skill in the art.

The fault tolerant BBW system 102 comprises a pedal assembly 116, brake assemblies 118a-118d (i.e., brake corner modules), one or more actuator units 120a-120d, one or more wheel sensors 122a and 122b, and an electronic brake system (EBS) controller 200. Although two wheel sensors 122a and 122b are shown, it should be appreciated that the number of wheel sensors may vary, e.g., 4 wheel sensors may be included, without departing from the scope of the invention. In at least one embodiment, the actuator units 120a-120d include one or more smart actuator units implemented with an individual hardware controller and one or more slave electro-mechanical actuator units that exclude the hardware controller as discussed in greater detail herein. The actuator units 120a-120d and/or the sensors 122a-122b may communicate data between one another via a communication data bus. The data may be delivered over a communication interface including, but not limited to, FlexRay™, Ethernet, and a low-power message-based interface such as, for example, a controller area network (CAN) bus. FlexRay™ is a high-speed, fault tolerant time-triggered protocol including both static and dynamic frames. FlexRay™ may support high data rates of up to 10 Mbit/s.

The pedal assembly 116 includes a brake pedal 124, a pedal force sensor 126, and a pedal travel sensor 128. The pedal assembly 116 can be any combination of hardware and software. For example, the pedal assembly 116 can be a pedal emulator that behaves like a push through mechanical pedal of a hydraulic braking system. In at least one embodiment, the pedal assembly 116 may be operated exclusively of electronic wiring and hardware computer processors to achieve vehicle braking while omitting various mechanical and/or hydraulic components found in traditional pedal assemblies.

Brake pedal travel and/or braking force applied to the brake pedal 124 may be determined based on respective signals output from the pedal force sensor 126 and the pedal travel sensor 128 as understood by one of ordinary skill in the art. According to a non-limiting embodiment, the pedal force sensor 126 is implemented as a force/pressure transducer or other suitable force sensor configured or adapted to precisely detect, measure, or otherwise determine an apply pressure or force imparted to the brake pedal 124 by an operator of vehicle 100. The pedal travel sensor 128 may be implemented as a pedal position and range sensor configured or adapted to precisely detect, measure, or otherwise determine the relative position and direction of travel of brake pedal 124 along a fixed range of motion when the brake pedal 124 is depressed or actuated.

The measurements or readings obtained by the pedal force sensor 126 and the pedal travel sensor 128 are transmittable or communicable as needed for use with one or more braking algorithms stored in memory of an electronic controller. The data from the pedal force sensor 126 and/or pedal travel sensor 128 may also be used to calculate, select, and/or otherwise determine a corresponding braking request or braking event in response to the detected and recorded measurements or readings output from the wheel sensors 122a and 122b. Based on the determined braking request or braking event, the EBS controller 200 may perform various braking algorithms, speed calculations, distance-to-brake calculations, etc. In addition, the EBS controller 200 may control various braking mechanisms or systems such as, for example, an electronic emergency brake.

The wheel sensors 122a and 122b may provide various types of vehicle data including, but not limited to, speed, acceleration, deceleration, and vehicle angle with respect to the ground, and wheel slippage. In at least one embodiment, the fault tolerant BBW system 102 may include one or more object detection sensors 129 disposed at various locations of the vehicle 100. The object detection sensors 129 are configured to detect the motion and/or existence of various objects surrounding the vehicle including, but not limited to, surrounding vehicles, pedestrians, street signs, and road hazards. The object detection sensors 129 may provide data indicating a scenario (e.g., a request and/or need) to slow down and/or stop the vehicle based on vehicle speed, object proximity to the vehicle 100, etc. In response to determining the braking scenario, one or more brake assemblies 118a-118d may be controlled to slow or stop the vehicle 100 as discussed in greater detail herein.

According to at least one embodiment, the fault tolerant BBW system 102 may also include an isolator module (not shown in FIG. 1) and one or more power sources (not shown in FIG. 1). The isolator module may be configured as an electrical circuit and is configured to isolate circuit faults on a signaling line circuit (SLC) loop. The isolator module also limits the number of modules or detectors that may be rendered inoperative by a circuit fault (e.g., short to ground, over-voltage, etc.) on the SLC loop. According to a non-limiting embodiment, if a circuit fault occurs, the isolator module may automatically create and open-circuit (disconnect) in the SLC loop so as to isolate the brake assemblies 118a-118d from a circuit fault condition. In addition, if a failure of a power source occurs, the isolator module may disconnect the failed power source while maintaining the remaining power sources. In this manner, the fault tolerant BBW system 102 according to a non-limiting embodiment provides at least one fault tolerant feature, which may allow one or more brake assemblies 118a-118d to continue operating in the event a circuit fault condition occurs in the fault tolerant BBW system 102. When the circuit fault condition is removed, the isolator module may automatically reconnect the isolated section of the SLC loop, e.g., the brake assemblies 118a-118d to the power sources.

Figure 2:
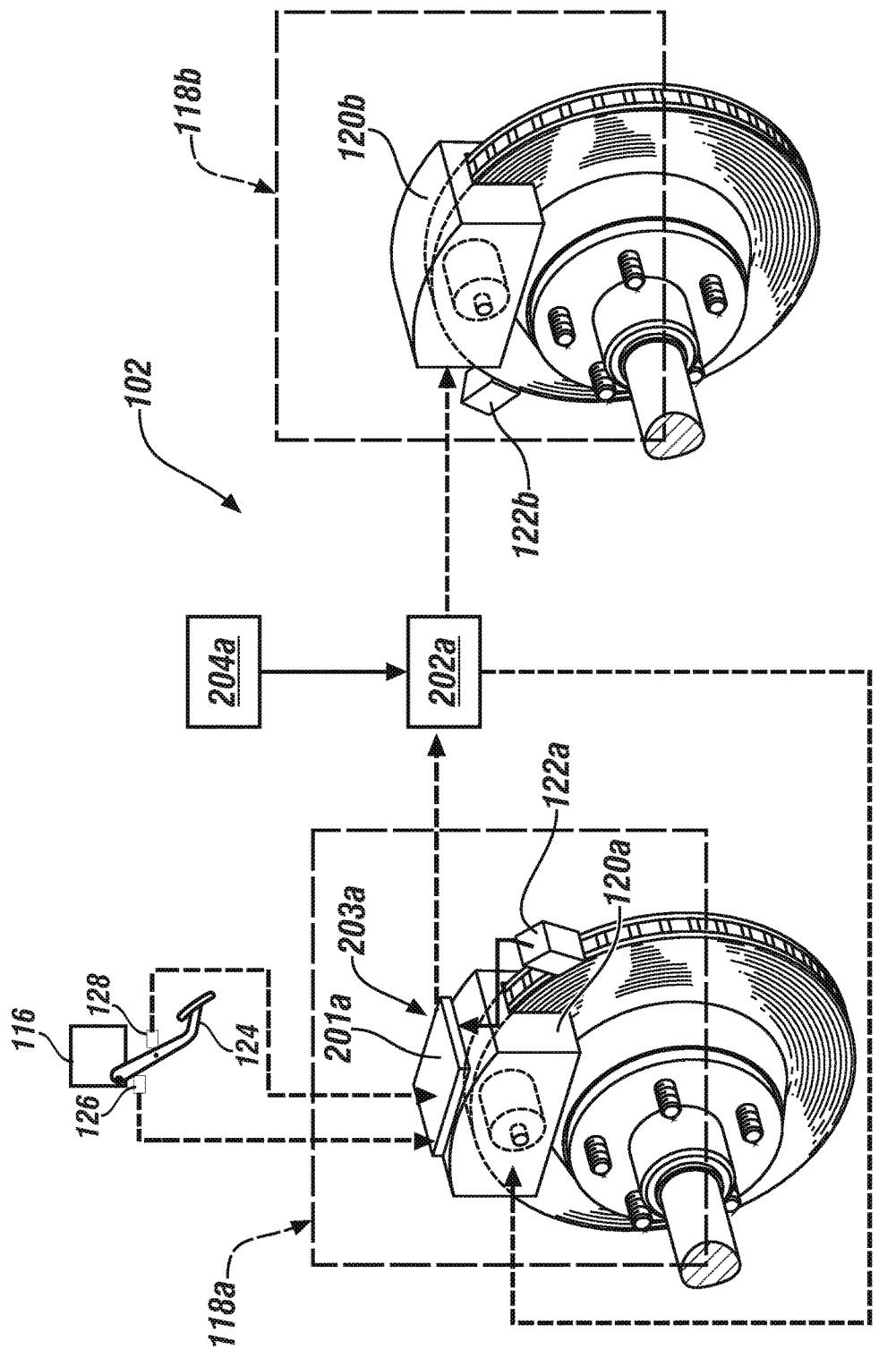
FIG. 2 illustrates a smart actuator unit including an actuator controller in electrical communication with a slave electro-mechanical actuator.

Referring to FIG. 2, a smart actuator unit 203a is integrated in a first brake assembly 118a (i.e., a smart brake assembly 118a) that is coupled to a first wheel (e.g., 112a) is shown in signal communication with a slave electro-mechanical actuator 120b included in a second brake assembly 118b (i.e., a slave brake assembly 118b) coupled to a second wheel (e.g., 112b) is according to a non-limiting embodiment. Although a single smart actuator unit (e.g., 203a) and a single slave electro-mechanical actuator (e.g., 120b) are illustrated in FIG. 2, it should be appreciated that the remaining smart actuators units and slave electro-mechanical actuators implemented in the fault tolerant BBW system 102 may operate in a similar manner as described herein.

The smart actuator unit 203a includes an actuator controller 201a and an electronically controlled actuator 120a such as, for example, an electronic brake caliper (e-caliper) 120a. Integrating the actuator controller 201a and electro-mechanical actuator 120a as a single component offers fast, robust, and diagnosable communication between the actuator controller 201a and the electro-mechanical actuator 120a, while reducing data latency and decreasing overall vehicle weight. In addition, one or more brake assemblies (e.g., 118a) may be individually controlled using the actuator controller (e.g., 201a) integrated therein.

The actuator controller 201a includes a hardware processor and memory that stores executable instructions including, but not limited to, braking algorithms and self-diagnosis algorithms. The hardware processor is configured to read and execute the instructions stored in the memory so as to control the fault tolerant BBW system 102. Accordingly, the actuator controller 201a may selectively output a low-power data command signal (e.g., low-power digital signal) in response to one or more braking events. The data command signal may be delivered over a low-power message based interface or transmission channel such as, for example, a controller area network (CAN) bus. The data command signal initiates one or more actuator driver units (e.g., 202a) located remotely from the smart actuator unit 203a installed in the first brake assembly 118a and the slave electro-mechanical actuator 120b installed in the second brake assembly 118b as discussed in greater detail herein.

The programmable memory included in the actuator controller 201a may store flashable software to provide flexibility for production implementation. In this manner, the actuator controller 201a is capable of rapidly executing the necessary control logic for implementing and controlling the actuator drivers (e.g., power circuits) using a brake pedal transition logic method or algorithm which is programmed or stored in memory.

The actuator controller 201a (e.g., the memory) may also be preloaded or preprogrammed with one or more braking torque look-up tables (LUTs) i.e. braking torque data tables readily accessible by the microprocessor in implementing or executing a braking algorithm. In at least one embodiment, the braking torque LUT stores recorded measurements or readings of the pedal assembly 116 (e.g., the pedal force sensor) and contains an associated commanded braking request appropriate for each of the detected force measurements. The actuator controller 201a may also store a pedal position LUT, which corresponds to the measurements or readings monitored by the sensors (e.g., the pedal travel sensor 128) and contains a commanded braking request appropriate for the detected position of the pedal.

The slave electro-mechanical actuator 120b may be constructed as an electronically controlled mechanical actuator 120b such as, for example, a conventional electronic brake caliper (e-caliper) 120b. As mentioned above, conventional slave electro-mechanical actuators (e.g., 120b) differ from the smart actuator units (e.g., 203a) in that they exclude an actuator controller (e.g., 201). Accordingly, at least one embodiment provides a feature where each slave electro-mechanical actuator is initiated via an actuator controller (e.g., 201a) integrated in a smart brake assembly (e.g., 118a) located remotely from the slave brake assembly (e.g., 118b).

Still referring to FIG. 2, the fault tolerant BBW system 102 further includes one or more actuator driver units 202a. Although a single actuator driver 202a is illustrated, it should be appreciated that multiple actuator driver units may be individually installed in the fault tolerant BBW system 102. The actuator driver unit 202a receives a constant high-power input signal from one or more power sources 204a, and generates a high-frequency switched high-power drive signal which is delivered to one or more brake assemblies 118a and 118b. The actuator driver unit 202a may include various power electronic components and/or circuits including, but not limited to, h-bridges, heat sinks, application-specific integrated circuits (ASICs), controller area network (CAN) transceivers or temperature or current sensors. In at least one embodiment, the actuator driver unit 202a includes a pulse width modulation (PWM) circuit coupled to an amplifier circuit so as to convert the constant high-power signal into a high-frequency switched high-power signal. The high-frequency switched high-current signal may have a frequency ranging from approximately 15 kilohertz (kHz) to approximately 65 kHz, and may have a current value of approximately 0 amps to approximately 200 amps.

According to at least one embodiment, a single actuator driver 202a may output a high-frequency switched high-power signal (e.g., a switched high-current signal) to drive the electro-mechanical actuator 120a integrated with the smart brake assembly 118a and also the slave electro-mechanical actuator 120b installed in the slave brake assembly 118b. In response to the high-frequency switched high-power signal, the smart electro-mechanical actuator 120a applies a variable (i.e., adjustable) frictional force to slow down the wheel (e.g., 112a) coupled to the first brake assembly 118a, while the slave electro-mechanical actuator 120b applies a variable (i.e., adjustable) frictional force to slow down the wheel (e.g., 112b) coupled to the second brake assembly 118b.

Figure 3A:
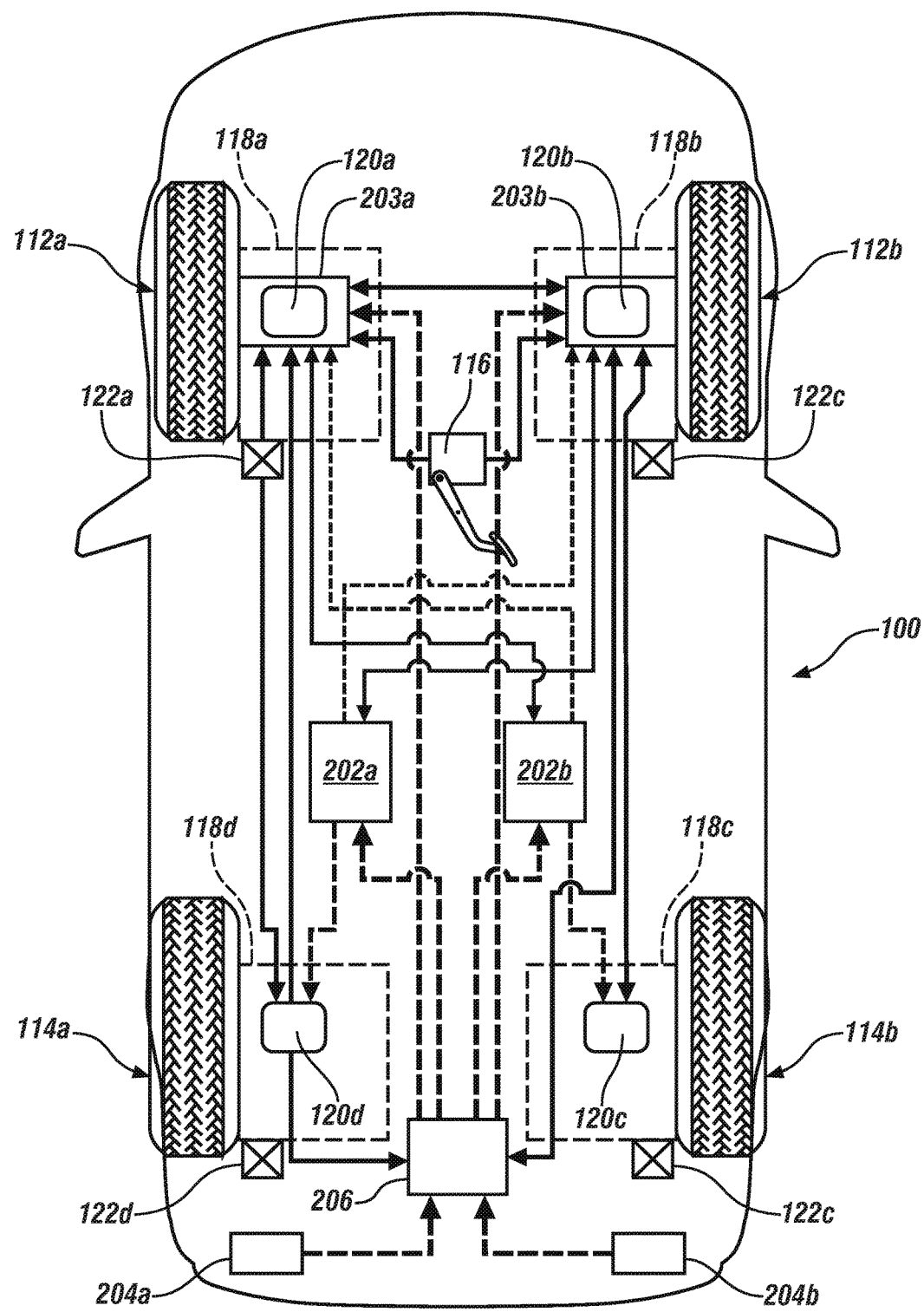
FIG. 3A is a schematic view of a fault tolerant BBW system based on a split EBS controller topology according to a non-limiting embodiment.
Figure 3B:
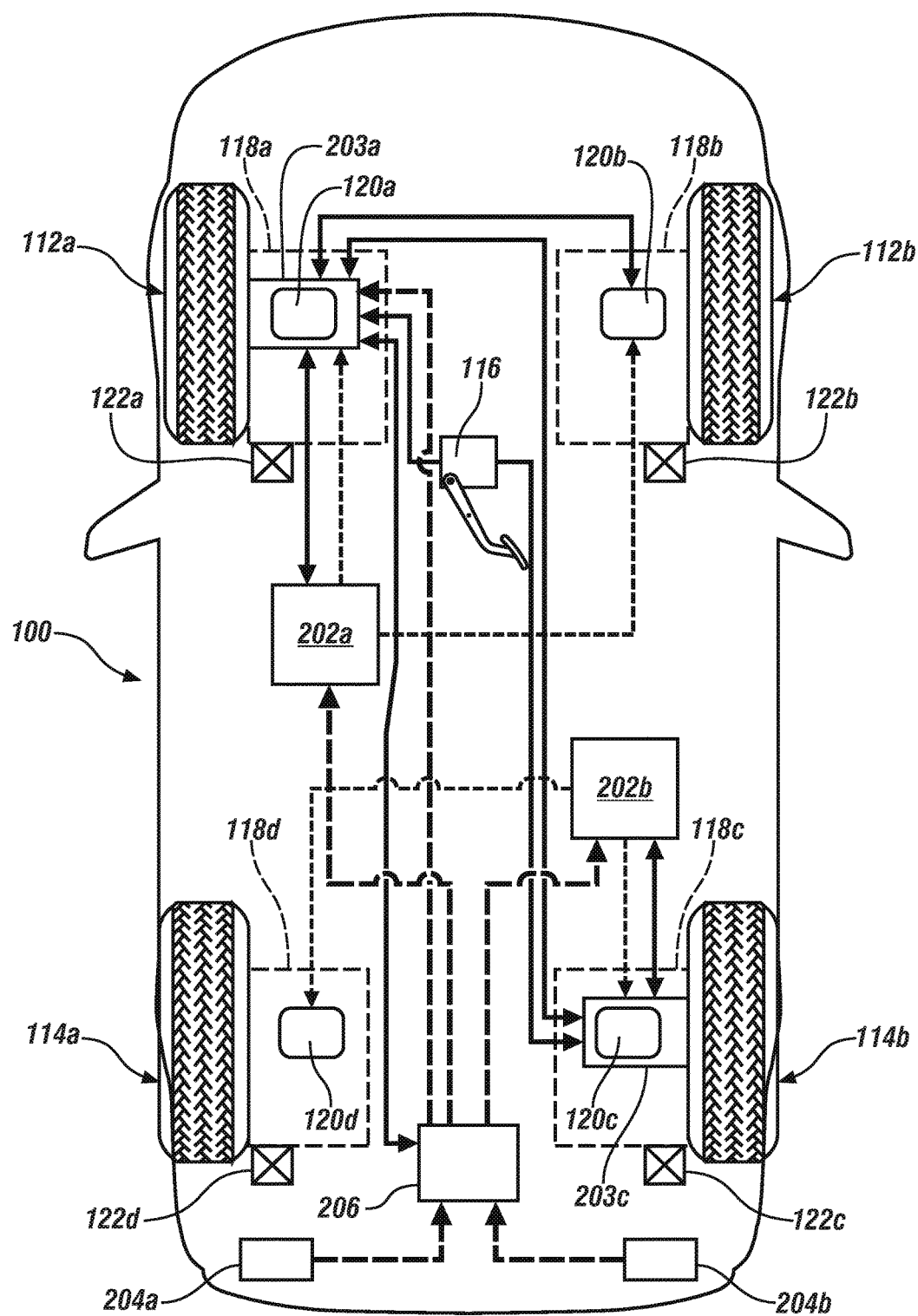
FIG. 3B is a schematic view of a fault tolerant BBW system based on a split EBS controller topology according to another non-limiting embodiment.
Figure 3C:
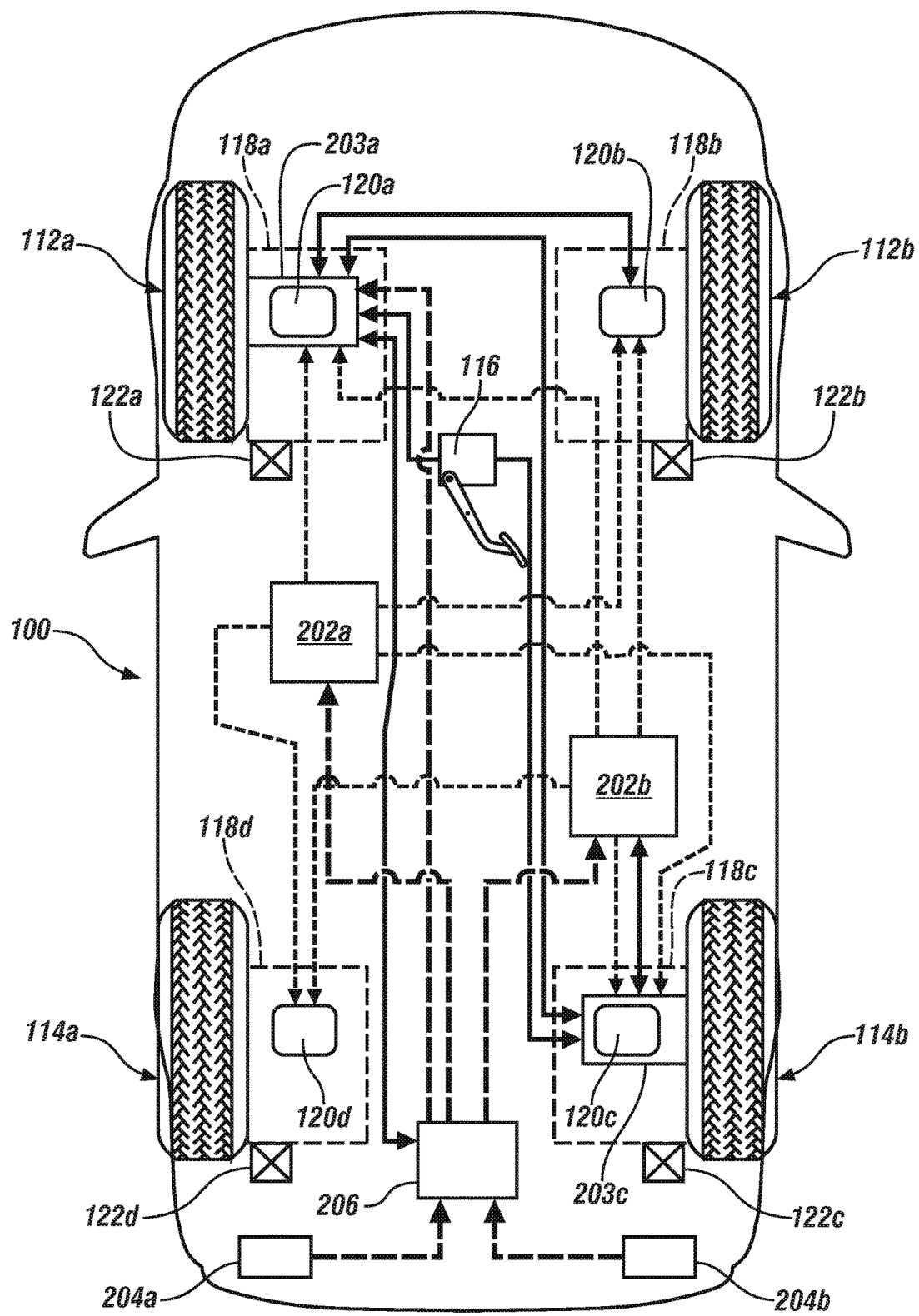
FIG. 3C is a is a schematic view of a fault tolerant BBW system based on a full EBS controller topology according to a non-limiting embodiment.

Turning to FIGS. 3A-3C, various topologies for implementing a fault tolerant BBW system 102 are illustrated according to non-limiting embodiments. Referring first to FIG. 3A (and also at times referring back to FIG. 2), a fault tolerant BBW system 102 based on a first split EBS controller topology (e.g., a diagonal split topology) is illustrated according to a non-limiting embodiment. In at least one embodiment, the diagonal split topology includes a plurality of brake assemblies 118a-118d configured to brake a respective wheel 112a and 112b, and 114a and 114b of the vehicle 100.

According to a non-limiting embodiment, the plurality of brake assemblies 118a-118d include a first group of brake assemblies 118a and 118b that are each integrated with a smart actuator unit 203a and 203b, respectively, and a second group of brake assemblies 118c and 118d that implement slave electro-mechanical actuator 120c and 120d, respectively. That is, the second group of brake assemblies 118c and 118d exclude a locally integrated electronic actuator controller. Accordingly, the first group of brake assemblies 118a and 118b may be referred to as smart brake assemblies 118a and 118b, while the second group of brake assemblies may be referred to as slave brake assemblies 118c and 118d.

The smart brake assemblies 118a and 118b and the slave brake assemblies 118c and 118d each include electro-mechanical actuators such as, for example, an electrically controlled caliper (i.e., e-caliper) and/or motor. The electro-mechanical actuators 120a and 120b included in the smart brake assemblies 118a and 118b, respectively, may be referred to as smart electro-mechanical actuators 120a and 120b while the electro-mechanical actuators 120c and 120d included in the slave brake assemblies 118c and 118d, respectively, may be referred to as slave electro-mechanical actuators 120c and 120d.

A first smart brake assembly 118a may control braking of a first wheel 112a located at a driver side of the vehicle 100 (e.g., the front driver-side wheel 112a) and a second smart brake assembly 118b may control braking of a second wheel 112b located at a passenger side of the vehicle 100 (e.g., the front passenger-side wheel 112b). A first slave brake assembly 118c may control braking of a third wheel 114b located at the passenger side of the vehicle 100 (e.g., the rear passenger-side wheel 114b) and a second slave brake assembly 118d may control braking of a fourth wheel 114a located at the driver side of the vehicle 100 (e.g., the rear driver-side wheel 114a).

The fault tolerant BBW system 102 further includes a first actuator driver unit 202a located at a first side (e.g., the driver-side) of the vehicle 100 and a second actuator driver unit 202b located at an opposing side (e.g., the passenger side) of the vehicle 100. Each actuator driver unit 202a and 202b includes various power circuits configured to convert a constant high power input signal (e.g., non-switched high power input current) output from power sources 204a and 204b into a high-power drive signal configured to drive the electro-mechanical actuators 120a-120d. The constant high-power input signals delivered by the power sources 204a and 204b may range from approximately 0 amps to approximately 200 amps. As previously mentioned, the power circuits may include a PWM module and amplifier circuit configured to convert the output from the power sources 204a and 204b into a high-frequency switched high-current signal.

According to the non-limiting embodiment illustrated in FIG. 3A, the diagonal split topology is achieved by electrically connecting the first smart actuator unit 203a (which controls braking of the front driver-side wheel 112a) with the second actuator driver unit 202b located at the passenger-side of the vehicle 100, while electrically connecting the second smart actuator unit 203b (which controls braking of the front passenger-side wheel 112b) with the first actuator driver unit 202a located at the driver-side of the vehicle 100. In this manner, each actuator driver unit 202a and 202b outputs high-power drive signals to brake assemblies that are located diagonally with respect to one another as discussed in greater detail herein.

The first and second smart actuator units 203a and 203b are configured to detect a braking event or braking request in response to signals output from the pedal assembly 116 and/or object detection sensors. Although not illustrated in FIG. 3A, the pedal unit 116 includes various sensors that monitor the pedal including, but not limited to, a pedal force sensor and a pedal travel sensor. The signals output from the pedal force sensor and the pedal travel sensor may be delivered to both smart actuator units 203a and 203b to provide output redundancy.

Based on the detected braking event or braking request, the first smart actuator unit 203a outputs a first digital command signal that initiates the second actuator driver unit 202b while the second smart actuator unit 203b generates a second digital command signal that initiates the first actuator driver unit 202a. In response to the first digital command signal, the second actuator driver unit 202b generates high-power drive signals that drive both the smart electro-mechanical actuator 120a installed in the first smart brake assembly 118a and the slave electro-mechanical actuator 120c installed in the second slave brake assembly 118c which is located diagonally from the first smart brake assembly 118a.

In a similar manner, the second digital command signal initiates the first actuator driver unit 202a to generate high-power drive signals that drive both the smart electro-mechanical actuator 120b installed in the second smart brake assembly 118b (e.g., the front passenger-side brake assembly 118b) and the slave electro-mechanical actuator 120d installed in the second slave brake assembly 118d (e.g., the rear driver-side brake assembly 118d) located diagonally from the second smart brake assembly 118b.

As further illustrated in FIG. 3A the first smart actuator unit 203a is in electrical communication with the second smart actuator unit 203b. In this manner, the smart actuator units 203a and 203b (i.e., the actuator controllers) may share data with each other. The shared data includes, for example, detected brake requests, and diagnostic results obtained after performing self-diagnostic tests. Accordingly, one or more of the smart actuator units 203a and 203b may determine if an actuator controller and/or actuator driver unit 202a and 202b contains a fault or is not operating according to expectations.

In at least one embodiment, an isolator module 206 is connected between the first and second power sources 204*a* and 204*b*, and the remaining electrical system of the fault tolerant BBW system 102. The isolator module 206 is configured to receive the constant high power signals generated by the first and second power sources 204*a* and 204*b*, and generate a plurality of individual power input signals.

For example, the isolator module 206 outputs first and second constant high voltage power signals to each actuator driver unit 202*a*. The isolator module 206 also outputs a low power signal that powers the actuator controller integrated with their respective smart actuator units 203*a* and 203*b*. In this manner, the first and second smart actuator units 203*a* and 203*b* may obtain various diagnostic information including, but not limited to, short circuit events, open circuit events, over voltage events, or other fault circuit events.

As mentioned above, the isolator module 206 may also be configured to isolate circuit faults such as, for example, wire-to-wire short circuits on a signaling line circuit (SLC) loop, and is capable of limiting the number of modules or detectors that may be rendered inoperative by a fault condition on the SLC loop. According to a non-limiting embodiment, if a wire-to-wire short occurs, the isolator module 206 may automatically disconnect the SLC loop (e.g., create an open-circuit) so as to isolate the smart actuator units 203*a* and 203*b* from an electrical fault condition. In this manner, the fault tolerant BBW system 102 according to a non-limiting embodiment provides at least one fault tolerant feature. When the fault condition is removed, the isolator module 206 may automatically reconnect the isolated section of the SLC loop, e.g., reconnect the brake assemblies 118*a*-118*d* to the power sources 204*a* and/or 204*b*.

Turning now to FIG. 3B, a fault tolerant BBW system 102 based on a second split EBS controller topology (e.g., a front/rear split topology) is illustrated according to a non-limiting embodiment. Similar to the diagonal split topology described above with respect to FIG. 3A, the fault tolerant BBW system 102 includes a plurality of smart brake assemblies and a plurality of slave brake assemblies. In the front/rear split topology, however, a first smart brake assembly 118*a* may control braking of a first wheel 112*a* located at a driver side of the vehicle 100 (e.g., the front driver-side wheel 112*a*) while a second smart brake assembly 118*c* may control braking of a second wheel 114*b* located at a passenger side of the vehicle 100 (e.g., the rear passenger-side wheel 114*b*).

The remaining wheels are coupled to slave brake assemblies. For instance, a first slave brake assembly 118*b* controls braking of a third wheel 112*b* located at the passenger side of the vehicle 100 (e.g., the front passenger-side wheel 112*b*) while a second slave brake assembly 118*d* may control braking of a fourth wheel 114*a* located at the driver side of the vehicle 100 (e.g., the rear driver-side wheel 114*a*).

According to the non-limiting embodiment in FIG. 3B, the front/rear split topology is achieved by electrically connecting the first smart actuator unit 203*a* (which controls braking of the front driver-side wheel 112*a*) with the first actuator driver unit 202*a* located at the front driver-side of the vehicle 100, while electrically connecting the second smart actuator unit 203*c* (which controls braking of the rear passenger-side wheel 114*b*) with the second actuator driver unit 202*b* located at the rear passenger-side of the vehicle 100. Accordingly, the first actuator driver unit 202*a* may be installed in close proximity to the first smart brake assembly 118*a* and the second actuator driver unit 202*b* may be installed in close proximity to the second smart brake assembly 118*c*.

Based on the digital command signals generated by the first smart actuator unit 203*a*, the first actuator driver unit 202*a* generates high-power drive signals that drive both the smart electro-mechanical actuator 120*a* installed in the first brake assembly 118*a* (e.g., the front driver-side brake assembly 118*a*) and the slave electro-mechanical actuator 120*b* installed in the second brake assembly 118*b* (e.g., the front passenger-side brake assembly 118*b*). Similarly, the digital command signals generated by the second smart actuator unit 203*c* initiate the second actuator driver unit 202*b* to output high-power drive signals that drive both the smart electro-mechanical actuator 120*c* installed in the third brake assembly 118*c* (e.g., the rear passenger-side brake assembly 118*c*) and the slave electro-mechanical actuator 120*d* installed in the fourth brake assembly 118*d* (e.g., the rear driver-side brake assembly 118*d*). In this manner, a front/rear topology is formed where the first actuator driver unit 202*a* drives the electro-mechanical actuators 118*a* and 118*b* located at the front of the vehicle 100 while the second actuator driver unit 202*b* drives the electro-mechanical actuators 118*c* and 118*d* located at the rear of the vehicle 100.

Referring now to FIG. 3C, a fault tolerant BBW system 102 based on a full electronic brake system (EBS) controller topology is illustrated according to a non-limiting embodiment. The full EBS controller topology of FIG. 3C operates similar to the split EBS controller topologies described above with reference to FIGS. 3A-3B. However, the full EBS controller topology of FIG. 3C differs in that the first and second actuator driver units 202*a* and 202*b* are each electrically connected to every electro-mechanical actuator 120*a*-120*d* installed in the vehicle 100. In this manner, any of the electro-mechanical actuators 120*a*-120*d* may be controlled using a high-power drive signal output by the first actuator driver unit 202*a* and/or the second actuator driver unit 202*b*. Accordingly, the full controller BBW topology may provide additional fault tolerance functionality.

According to at least one embodiment, the smart actuator units 203*a* and 203*c* are configured to selectively operate in a split topology mode and a full topology mode based on data monitored by the actuator controller integrated in a respective smart actuator unit 203*a* and 203*c* (see element 201*a* in FIG. 2). The monitored data includes, but is not limited to, diagnostic results obtained in response to self-diagnostic operations executed by the actuator controllers.

When operating in the split topology mode, for example, the first actuator driver 202*a* drives electro-mechanical actuators included in a first group of brake assemblies, while the second actuator driver 202*b* drives electro-mechanical actuators included in a different group of brake assemblies. If the split topology mode is operating according to a diagonal split topology (see FIG. 3A), the first group of brake assemblies includes, for example, the second smart brake assembly 118*b* and the second slave brake assembly 118*d*, while the second group includes the first smart brake assembly 118*a* and the first slave brake assembly 118*c*.

If, however, the split topology mode is operating according to a front/rear split topology (see FIG. 3B), the first group of brake assemblies driven by the first actuator driver unit 202*a* includes a first smart brake assembly 118*a* and a and a first slave brake assembly 118*b*, while the second group of brake assemblies driven by the second actuator driver unit 202*b* includes a second smart brake assembly 118*c* and a second slave brake assembly 118*d*.

When operating in the full topology mode (see FIG. 3C), each of the first and second actuator driver units 202a and 202b are configured to output at least one high-power drive signal that drives each electro-mechanical actuator of a first group and each slave electro-mechanical actuator of a second group. That is, while operating in the full topology mode, the first smart actuator unit 203a and/or the second smart actuator unit 203c is capable of driving every electro-mechanical actuator 120a-120d installed in the vehicle.

As mentioned herein, the smart actuator units 203a and 203c may transition into the full EBS topology mode based on diagnostic results obtained in response to performing self-diagnostic testing. For example, the first smart actuator unit 203a may perform a first self-diagnostic operation and communicate first diagnostic results to the second smart actuator unit 203c. Similarly, the second smart actuator unit 203c may perform its own second self-diagnostic operation and can communicate second diagnostic results to the first smart actuator unit 203a. A full EBS topology mode may then be initiated if the first diagnostic results and/or the second diagnostic results indicate an error.

For example, if the second diagnostic results delivered by the second smart actuator unit 203c indicate that the second actuator driver unit 202b is faulty, the first smart actuator unit 203a can command the second smart actuator unit 203c to disable the faulty actuator driver unit 202b, and the fault tolerant BBW system 102 can invoke the full EBS topology mode. In turn, the first enhanced smart actuator 203a can command the remaining normal operating driver actuator unit 202a to output high-power driver signals to every electro-mechanical actuator 120a-120d installed in the vehicle 100. In this manner, if an actuator driver unit (e.g., 202a and 202b) contains a fault, the fault tolerant BBW system 102 may still be fully operated by the remaining normal operating actuator driver circuit thereby providing a fault tolerance feature.

Figure 4:
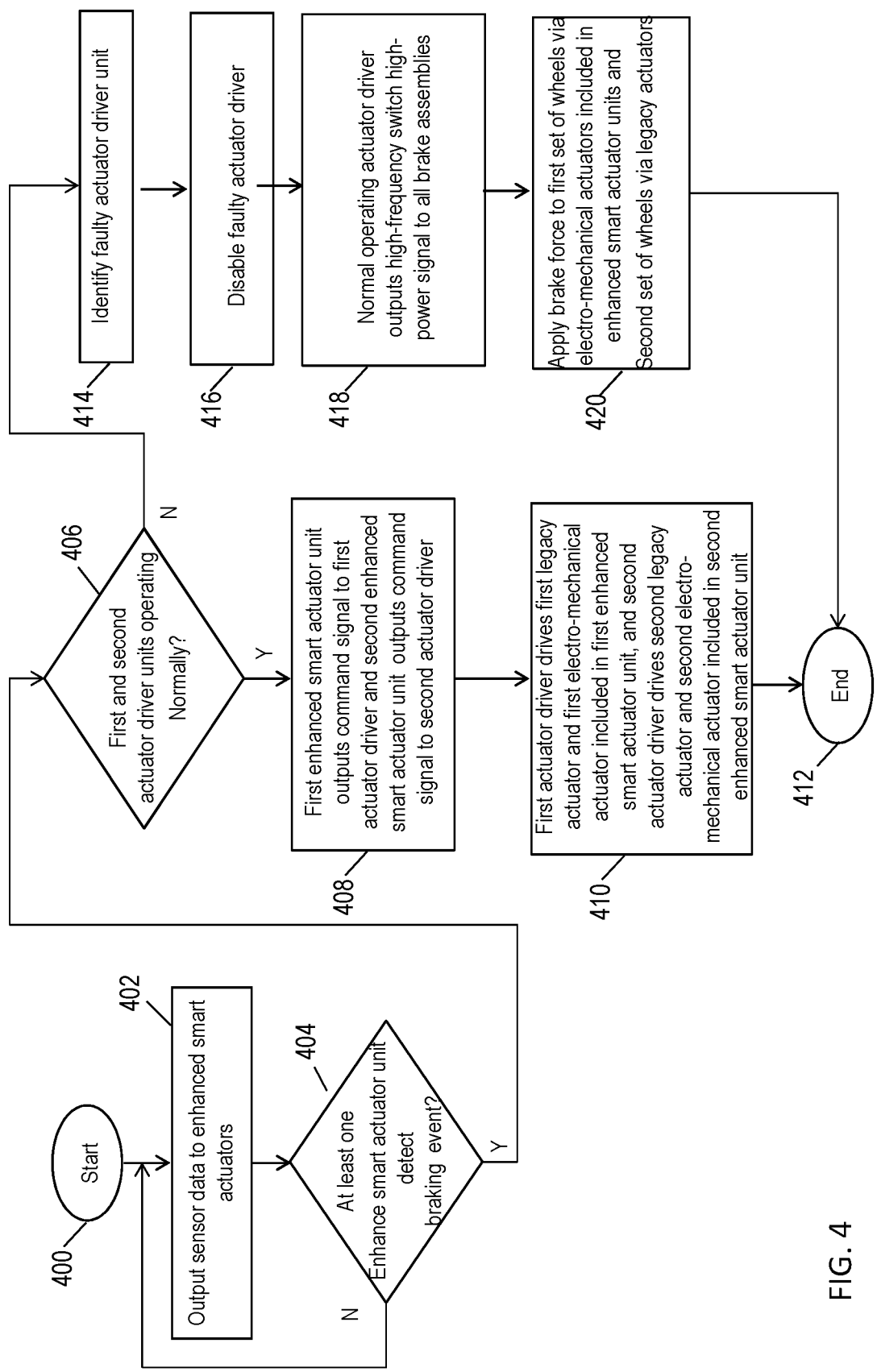
FIG. 4 is a flow diagram illustrating a method of controlling a fault tolerant BBW system according to a non-limiting embodiment.

Turning now FIG. 4, a flow diagram illustrates a method of controlling a fault tolerant electronic brake system according to a non-limiting embodiment. The method begins at operation 400, and at operation 402, sensor data is output to a first smart actuator unit and a second smart actuator unit. The sensor data may be output from various sensors installed on the vehicle including, but not limited to, wheel sensors, brake pedal sensors, and/or object detection sensors. At operation 404, a determination is made as to whether at least one smart actuator unit detects a braking event. The braking event is based on the sensor data described above. When no braking event is detected, the method returns to operation 402 and continues monitoring the sensor data.

When at least one of the smart actuator units detects a braking event, however, the method proceeds to operation 406 and the first and second smart actuator units communicate with one another so as to compare their respective detected braking event data. For example, a first smart actuator unit may detect a first braking event and may request confirmation that the second smart actuator unit detected the same or a similar braking event. When the braking event data monitored and generated by the first smart actuator unit matches or substantially matches the braking event data monitored and generated by the second smart actuator unit, the method proceeds to operation 408 where a first actuator controller of the smart actuator outputs a first digital command signal to drive a first actuator driver unit located remotely from the brake assemblies, and a second actuator controller of the second smart actuator unit outputs a second digital command signal to drive a second actuator driver unit also located remotely from the brake assemblies.

At operation 410, the first actuator driver unit outputs high-power driver signals that drive a first smart electro-mechanical actuator included in a first brake assembly and a first slave electro-mechanical actuator included in a second brake assembly. Similarly, the second actuator driver unit outputs high-power drive signals that drive a second smart electro-mechanical actuator included in a third brake assembly and a second slave electro-mechanical actuator included in a fourth brake assembly. Accordingly, the first electro-mechanical actuator included with the first smart actuator unit adjusts a first braking torque applied to the first wheel and the second electro-mechanical actuator included in the enhanced actuator unit adjusts a second braking torque applied to the second wheel, and the method ends at operation 412. In this manner, the first actuator driver is configured to independently drive a first group of brake assemblies while the second actuator driver is configured to independently drive a different group of brake assemblies.

Referring back to operation 406, a scenario may occur where the braking event data monitored and generated by the first smart actuator unit does not match or substantially match the braking event data monitored and generated by the second smart actuator unit. In this case, the method proceeds to operation 414 where a fault actuator driver unit is identified, and the faulty actuator driver unit is disabled at operation 416. In at least one embodiment, the actuator controller which initiates the faulty actuator driver unit is disabled so as to also disable the faulty actuator driver unit. At operation 418, the remaining activated smart actuator unit outputs a data command signal to its corresponding actuator driver unit commanding the actuator driver unit to output high-power drive signals to every electro-mechanical actuator (i.e., every brake assembly) installed on the vehicle. At operation 420, each smart electro-mechanical actuator and each slave electro-mechanical braking force apply a braking force in response to the high-power drive signal output from a common actuator driver unit, and the method ends at operation 412. In this manner, all electro-mechanical actuators may be controlled in response to a detected braking event even if an actuator driver unit and/or smart actuator unit controlling an actuator driver unit does not operate as expected.

As described in detail above, various non-limiting embodiments provide a BBW system including a data interface connecting electronic brake controllers and smart brake actuators. According to a non-limiting embodiment, a first smart actuator included in a first brake assembly is controlled by a first actuator controller while a second smart actuator included in a second brake assembly is controlled by a second actuator controller. Each actuator controller may output low-power data command signals to a respective actuator driver unit (e.g., power circuit) via a low-power message-based interface such as, for example, a controller area network (CAN) bus. Accordingly, a flexible BBW system is provided that allows for flexible design choice, wire length reduction, and flexible braking algorithm implementation, while still employing fault tolerance into the system.

As used herein, the term "module" or "unit" refers to an application specific integrated circuit (ASIC), a field programmable gate array (FPGA), an electronic circuit, an electronic computer processor (shared, dedicated, or group) and memory that executes one or more software or firmware programs, a combinational logic circuit, and/or other suitable components that provide the described functionality. When implemented in software, a module can be embodied in memory as a non-transitory machine-readable storage medium readable by a processing circuit and storing instructions for execution by the processing circuit for performing a method.

While the embodiments have been described, it will be understood by those skilled in the art that various changes may be made and equivalents may be substituted for elements thereof without departing from the scope of the embodiments. In addition, many modifications may be made to adapt a particular situation or material to the teachings of the embodiments without departing from the essential scope thereof. Therefore, it is intended that the disclosure not be limited to the particular embodiments disclosed, but that the disclosure will include all embodiments falling within the scope of the application.

What is claimed is:

1. A vehicle including a fault tolerant electronic brake-by-wire (BBW) system, the vehicle comprising:
   a plurality of brake assemblies, each brake assembly among the plurality of brake assemblies configured to control braking of a respective wheel of the vehicle, the plurality of brake assemblies including:
      a first brake assembly integrated with a smart actuator unit including a first actuator controller and a first electro-mechanical actuator that is configured to adjust a brake force applied to a first wheel coupled to the first brake assembly;
      a second brake assembly excluding an integrated actuator controller and having installed therein a second electro-mechanical actuator that is configured to adjust a brake force applied to a second wheel coupled to the second brake assembly; and
      at least one electronic actuator driver unit remotely located from the first and second brake assemblies, and configured to output a high-power signal that drives the first and second electro-mechanical actuators in response to receiving a digital command signal from the first actuator controller, the high-power signal capable of reaching a current level of 200 amps.

2. The vehicle of claim 1, wherein each actuator driver unit includes a power circuit configured to output the high-power signal as a high-frequency switched high-power current drive signal that drives the first and second electro-mechanical actuators, the high-frequency switched high-power current drive signal capable of reaching a frequency of 65 kHz.

3. The vehicle of claim 2, wherein the first actuator controller is in electrical communication with at least one sensor to detect a braking request, and outputs the digital command signal in response to the braking request.

4. The vehicle of claim 1, further comprising a third brake assembly including a second smart actuator unit integrated with a second electronic actuator controller and a third electro-mechanical actuator, and a fourth brake assembly excluding an integrated electronic actuator controller and having installed therein a fourth electro-mechanical actuator.

5. The vehicle of claim 4, wherein the at least one electronic actuator driver unit includes a first actuator driver unit that drives the first and second electro-mechanical actuators, and a second actuator driver unit that generates a second high-power signal that drives the third and fourth electro-mechanical actuators in response to receiving a second digital command signal from the second actuator controller, the second high-power signal capable of reaching a current level of 200 amps.

6. The vehicle of claim 5, wherein the first and second actuator controllers generate operational data based on a state of the respective wheel coupled to a respective brake assembly of the plurality of brake assemblies.

7. The vehicle of claim 6, wherein at least one of the first smart actuator unit and the second smart actuator unit diagnoses operation of at least one brake assembly among the plurality of brake assemblies based on the operational data.

8. The vehicle of claim 7, wherein the first smart actuator unit is in signal communication with the second smart actuator unit.

9. A vehicle including a fault tolerant electronic brake-by-wire (BBW) system, the vehicle comprising:
   a plurality of brake assemblies configured to control braking of respective wheels of the vehicle, the plurality of brake assemblies comprising a first group of brake assemblies each integrated with an electronic smart actuator unit that includes an electronic actuator controller and an electro-mechanical actuator, and a second group of brake assemblies each excluding an integrated electronic actuator controller and having a slave electro-mechanical actuator installed therein;
   first and second actuator driver units located remotely from the brake assemblies, each of the first and second actuator driver units being in electrical communication with each electro-mechanical actuator of the first group and each slave electro-mechanical actuator of the second group;
   wherein each of the first and second actuator driver units are configured to output at least one high-power drive signal that drives each electro-mechanical actuator of the first group and each slave electro-mechanical actuator of the second group, the at least one high-power drive signal capable of reaching a current level of 200 amps.

10. The vehicle of claim 9, wherein the first actuator driver unit outputs a first high-power drive signal among the at least one high-power drive signal in response to receiving a first digital command signal output from the first smart actuator unit, and wherein the second actuator driver unit outputs a second high-power drive signal among the at least one high-power drive signal in response to receiving a second digital command signal output from the second smart actuator unit, the at least one second high-power drive signal capable of reaching a current level of 200 amps.

11. The vehicle of claim 10, wherein the actuator controllers included in the first group generate operational data based on at least one of a torque force applied to a respective vehicle wheel, wheel speed of the respective vehicle wheel, and operation of the actuator driver units.

12. The vehicle of claim 11, wherein at least one of the smart actuator units diagnoses operation of at least one brake assembly included in the first and second groups based on the operational data.

13. The vehicle of claim 12, wherein the first smart actuator unit is in electrical communication with the second smart actuator.

14. The vehicle of claim 13, wherein the first actuator controller identifies the second actuator controller as faulty in response to detecting a fault indicated by the operational data, disables the second actuator controller in response to the faulty identification so as to deactivate the second actuator driver unit, and commands the first actuator driver unit to output the first high-power drive signal to the electro-mechanical actuators of the first group and the slave electro-mechanical actuators of the second group.

15. A method of controlling a fault tolerant electronic brake-by-wire (BBW) system, the method comprising:
   integrating in a first smart brake assembly a first smart actuator unit including a first electronic actuator controller and a first electro-mechanical actuator, and integrating in a first slave brake assembly a first slave electro-mechanical actuator that excludes an integrated electronic actuator controller; and
   outputting via the first electronic actuator controller a first digital command signal that initiates a first actuator driver unit located remotely from the first smart brake assembly and the first slave brake assembly,
   wherein in response to the first digital command signal, the first actuator driver unit outputs a high-power drive signal that controls braking of a first wheel coupled to the first brake assembly and controls braking of a second wheel coupled to the first slave brake assembly, the high-power drive signal capable of reaching a current level of 200 amps.

16. The method of claim 15, further comprising outputting a second digital command signal via a second electronic actuator controller integrated in a second smart brake assembly different from the first smart brake assembly.

17. The method of claim 16, further comprising driving the first actuator driver unit using the first digital command signal and driving a second actuator driver unit using the second digital command signal output, the second actuator driver located remotely from the first actuator driver unit.

18. The method of claim 17, further comprising electrically communicating diagnostic data between the first actuator controller and the second actuator controller via a messaged-based communication channel.

19. The method of claim 18, further comprising disabling one of the first and second actuator controllers so as to disconnect a corresponding first or second actuator driver unit based on the diagnostic data, and outputting the high-power drive signal via the remaining connected actuator driver unit to control the electro-mechanical actuator included in the smart brake assembly containing the disconnected actuator controller, along with the slave electro-mechanical actuator included in the slave brake assembly.

* * * * *